United States Patent [19]
Howard

[11] Patent Number: 5,217,660
[45] Date of Patent: Jun. 8, 1993

[54] METHOD FOR MANUFACTURING EXPANDED POLYSTYRENE FOAM COMPONENTS FROM USED POLYSTYRENE MATERIALS

[75] Inventor: Kevin A. Howard, Vancouver, Wash.

[73] Assignee: Hewlett-Packard Company, Palo Alto, Calif.

[21] Appl. No.: 724,006

[22] Filed: Jul. 1, 1991

[51] Int. Cl.⁵ .............................................. B29C 67/22
[52] U.S. Cl. .................................... 264/37; 264/45.4; 264/53; 264/126; 264/DIG. 69
[58] Field of Search ............. 264/51, 53, 37, DIG. 69, 264/126, 45.4

[56] References Cited

U.S. PATENT DOCUMENTS

| | | |
|---|---|---|
| 2,797,443 | 7/1957 | Carlson, Jr. . |
| 3,072,584 | 1/1963 | Karpovich . |
| 3,723,582 | 3/1973 | Winstead .............................. 264/37 |
| 3,876,741 | 4/1975 | Klein ........................... 264/DIG. 69 |
| 3,883,624 | 5/1975 | McKenzie et al. ................. 264/126 |
| 4,091,967 | 5/1978 | Kinoshita .................... 264/DIG. 69 |
| 4,136,142 | 1/1979 | Hargreaves et al. ................. 264/53 |
| 4,246,211 | 1/1981 | Kuhnel ....................... 264/DIG. 69 |
| 4,254,068 | 3/1981 | Otsuka ........................ 264/DIG. 69 |
| 4,255,372 | 3/1981 | Kuhnel et al. .............. 264/DIG. 69 |
| 4,360,486 | 11/1982 | Dibiasi et al. .............. 264/DIG. 69 |
| 4,448,737 | 5/1984 | Johnson .............................. 264/37 |
| 4,772,636 | 9/1988 | Sakata et al. ........................ 264/53 |
| 4,923,654 | 5/1990 | Freeland ............................... 264/53 |

FOREIGN PATENT DOCUMENTS 50-107084 8/1975 Japan .......................... 264/DIG. 69
884896 12/1961 United Kingdom .................. 264/37

OTHER PUBLICATIONS

Article entitled "Germany to Implement Tough Recycling Law," *Plastics News* (Apr. 29, 1991).
Promotional literature from Arco Chemical Company—Beaver Valley Plant involving polystyrene foam.
*Modern Plastics Encyclopedia*, vol. 49, No. 10A (1972–1973), pp. 97–98, 271–272, 296, and 314–315.

*Primary Examiner*—Allan R. Kuhns

[57] ABSTRACT

A method for recycling expanded polystyrene foam materials. Unexpanded virgin polystyrene beads having pentane gas contained therein are thermally expanded to produce a supply of expanded beads. Next, a supply of used expanded polystyrene foam is obtained and ground into small portions, preferably of the same size as the expanded beads. The used polystyrene foam pieces are then placed in contact with pentane gas. The expanded beads and the pentane-treated foam pieces are thereafter combined to form a mixture which preferably contains not less than about 50% by weight foam pieces. The mixture is then placed in a mold, followed by the application of heat and pressure thereto in order to produce a final product with a high degree of structural integrity. The pentane gas treatment of the foam pieces enables the fusion thereof to the expanded beads, resulting in a highly durable product.

20 Claims, 1 Drawing Sheet

METHOD FOR MANUFACTURING EXPANDED POLYSTYRENE FOAM COMPONENTS FROM USED POLYSTYRENE MATERIALS

BACKGROUND OF THE INVENTION

The present invention generally relates to the production of expanded polystyrene foam articles, and more particularly to the use of waste (used) expanded polystyrene foam materials in the production of new expanded polystyrene foam articles.

Expanded polystyrene foam is used throughout the world for a variety of different purposes. Many different manufacturers produce expanded polystyrene foam and products made from it, including but not limited to the Dow Chemical Company of Midland, Mich. which sells thermo-formed expanded polystyrene foam under the registered trademark STYROFOAM. Exemplary uses for expanded polystyrene foam include but are not limited to shock-absorbant packing materials, insulation materials for buildings, drinking cups, insulated containers, and the like. Expanded polystyrene foam products are strong, light, durable, and have excellent insulating properties. Various references involving the production of polystyrene foam include U.S. Pat. Nos. 2,797,443 and 3,072,584 which are incorporated herein by reference. Additional information on polystyrene foam is provided on pages 97-98, 271-272, 296, and 314-315 of the *Modern Plastics Encyclopedia*, Vol. 49, No. 10A (1972-1973) which is also incorporated herein by reference.

The production of expanded polystyrene foam conventionally beings with styrene monomer materials which are derived from crude oil. The styrene monomers are polymerized within a water suspension through the use of a free-radical initiator composition known in the art (e.g. an organic peroxide or persulfate). The polymerization process is exothermic in nature, and produces approximately 290 BTU/lb. of styrene monomer. In order to facilitate the polymerization process, various additional materials may be added to the water/monomer suspension, including but not limited to surfactants and the like. The resulting product consists of small beads having an average diameter ranging from about 0.0083-0.079 inches.

The beads are then impregnated with a material known as a "blowing agent" which enables subsequent expansion of the beads to occur. A preferred blowing agent consists of pentane. To impregnate the blowing agent into the beads, they are first introduced into a continuously-agitated pressurization vessel. Again, water, surfactants, and other additives known in the art may be added to the vessel along with the beads. The blowing agent is then introduced into the vessel, with the blowing agent thereafter impregnating the beads through various voids and pores in the bead structure. The beads are subsequently dried and sized as desired (preferably using a vibrating screen-type mechanism known in the art). Completed beads having a blowing agent (e.g. pentane gas) impregnated therein are commercially available from a wide variety of sources, including but not limited to Arco Chemical Company of Philadelphia, Pa.

The beads are then expanded using heat (e.g. steam) in a conventional manner to achieve a desired size and density. In a preferred embodiment, the completed beads at this stage have an average density of about 1.0-1.5 lb./cu. ft. Following expansion and stabilization (e.g. storage of the beads to allow the outgassing of residual pentane and moisture therefrom), the beads are placed in a mold which is used to produce the desired expanded polystyrene foam articles using heat and applied pressure.

However, in recent years, a number of environmental concerns have been raised with respect to expanded polystyrene foam articles. Specifically, expanded polystyrene foam is highly resistant to normal biodegradation processes, potentially causing disposal problems. Because expanded polystyrene foam does not degrade, it occupies a substantial and inordinate amount of space in landfills and waste storage sites. Many cities, states, and countries have imposed restrictions on the use of expanded polystyrene foam products, and have implemented rules stating that packaging products must have a specified amount of recycled/recovered materials therein. For example, the city of Portland, Oreg. U.S.A. passed an ordinance banning the use of polystyrene foam food containers and the like in view of numerous disposal problems with respect to these materials. In addition, Germany recently imposed a new recycling law that requires the recovery of at least 50% of all packaging materials by January 1993, and further requires the recovery of at least 80% of all metal, plastic, glass, and paper packaging materials by mid-1995.

With respect to expanded polystyrene foam, a number of methods have been attempted in order to recycle/recover this material. For example, waste foam materials have been ground and combined with virgin foam beads, with the waste foam materials merely functioning as "filler". This method is relatively ineffective, since waste foam materials have no fusion properties. As a result, the molded, expanded polystyrene product produced using this technique will have an inconsistent appearance and will fracture more easily on impact compared with virgin expanded polystyrene foam materials. Another technique involves the application of relatively-high heat to waste polystyrene foam so that the foam melts as described in U.S. Pat. No. 4,136,142 to Hargreaves et al. This process produces sheets of a material known as "high impact polystyrene" which has a number of undesirable physical properties/weaknesses. In addition, this is considered a "lower" form of recycling since the original structural and functional characteristics of the expanded polystyrene foam are lost with respect to the recycled product.

Thus, a need remains for a method wherein waste expanded polystyrene foam materials may be recycled in an effective, cost-efficient, and environmentally sound manner. The present invention satisfies this need in a unique and beneficial manner as described below.

SUMMARY OF THE INVENTION

It is an object of the present invention to provide a method for effectively recycling expanded polystyrene foam materials.

It is another object of the invention to provide a method for recycling expanded polystyrene foam materials which is highly effective, cost-efficient, and environmentally sound.

It is a further object of the invention to provide a method for recycling expanded polystyrene foam materials which is readily implemented on a large scale, mass production basis.

It is a still further object of the invention to provide a method for recycling expanded polystyrene foam materials which enables such materials to be used again in the production of new expanded polystyrene foam articles.

It is an even further object of the invention to provide a method for recycling expanded polystyrene foam materials which enables such materials to be effectively combined with virgin polystyrene materials in a manner wherein the combined materials are fused together to produce a strong and durable product.

In accordance with the foregoing objects, a highly efficient and environmentally safe method for recycling expanded polystyrene foam materials is described herein. To implement the process of the present invention, a supply of commercially available, unexpanded virgin polystyrene beads having a pentane gas blowing agent contained therein is first obtained. The unexpanded virgin polystyrene beads are then subjected to heat (e.g. steam) in order to produce expanded virgin polystyrene beads. In a preferred embodiment, the expanded virgin polystyrene beads are allowed to remain in a stationary location for a time period sufficient to permit the outgassing of moisture and pentane gas therefrom. Next, a supply of used expanded polystyrene foam is obtained and ground into small pieces, preferably of approximately the same size as the expanded virgin polystyrene beads.

The used expanded polystyrene foam pieces are thereafter placed in contact with pentane gas. The pentane gas may be obtained from a variety of different sources. For example, a supply of virgin pentane gas may be used to treat the used expanded polystyrene foam pieces. Pentane gas released during expansion of the unexpanded virgin polystyrene beads may also be used as described herein. Likewise, any residual pentane gas which is released during the outgassing of the expanded virgin polystyrene beads may be used to treat the used polystyrene foam pieces. All of these sources of pentane gas may be used either individually or in combination, depending on the production scale to be selected in the present invention.

The expanded virgin polystyrene beads and pentane-treated used polystyrene foam pieces are then combined in a mixture which preferably contains not less than about 50% by weight used polystyrene foam pieces. The mixture is thereafter placed in a conventional mold, followed by the application of heat and pressure thereto in accordance with foam fabrication processes known in the art. The molding process may also release a small amount of excess pentane gas from the expanded virgin polystyrene beads which can be collected and used to treat subsequent pieces of used polystyrene foam.

The resulting expanded polystyrene foam article is strong, durable, and light-weight. The pentane gas treatment of the used polystyrene foam pieces as described herein enables the fusion of these materials to the expanded virgin polystyrene beads so that a final product is produced with an unexpectedly high degree of structural integrity. Tests have shown that the product produced in accordance with the present invention has a level of structural integrity equal to or greater than the structural integrity of products produced entirely from virgin materials.

These and other objects, features, and advantages of the invention will be described below in the following Brief Description of the Drawings and Detailed Description of Preferred Embodiments.

BRIEF DESCRIPTION OF THE DRAWINGS

Illustrative and presently preferred embodiments of the invention are characterized in the following drawing figure.

DETAILED DESCRIPTION OF PREFERRED EMBODIMENTS

Figure 1:
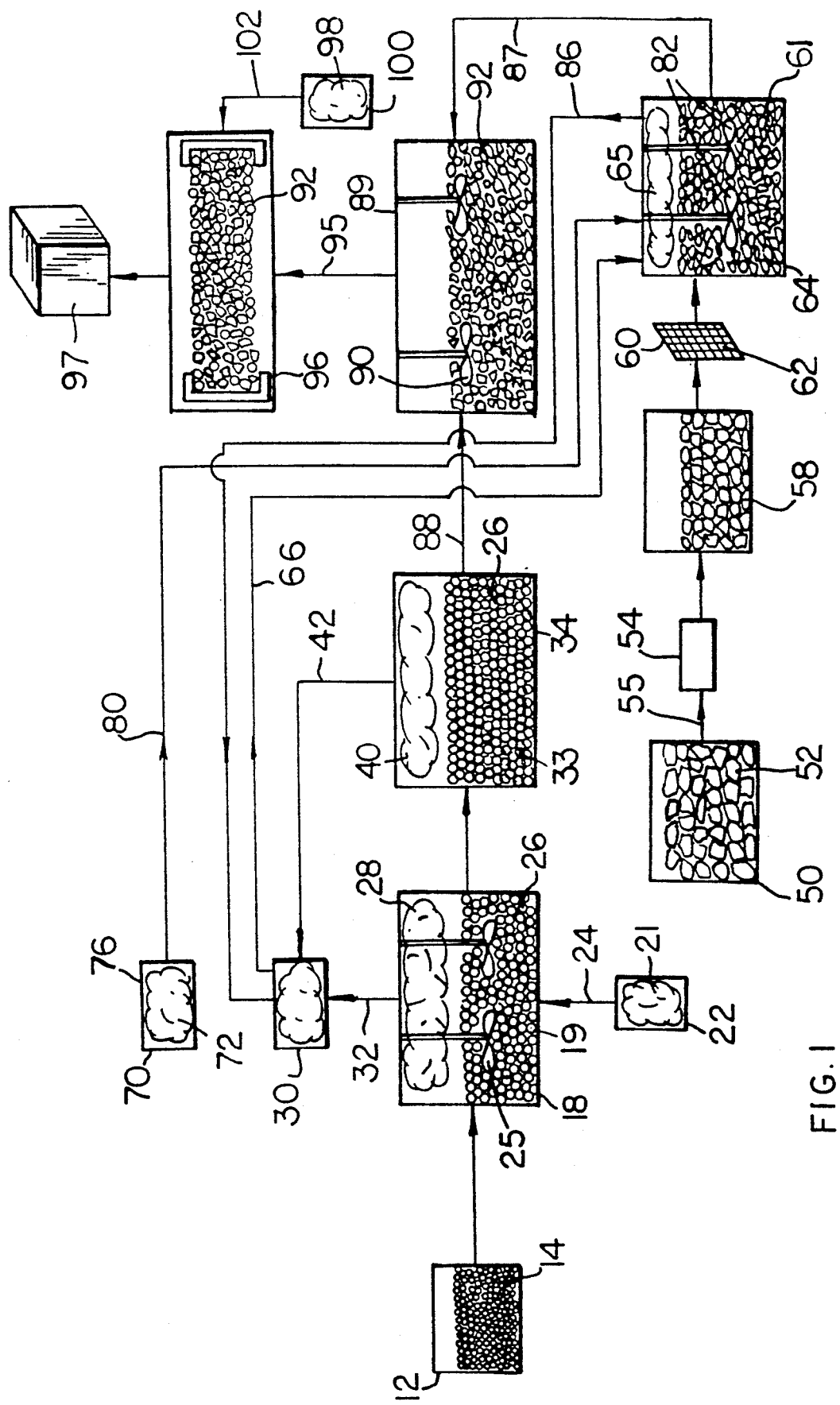
FIG. 1 is a flow diagram which schematically illustrates the formation of an expanded polystyrene foam article from used polystyrene foam materials combined with virgin polystyrene foam materials in accordance with the present invention.

The present invention involves a unique and highly efficient method for recycling used expanded polystyrene foam materials. Specifically, the invention enables used expanded polystyrene foam to be combined with virgin polystyrene materials in a special manner to produce an expanded polystyrene foam article of substantial strength and structural integrity.

The process of the invention is schematically illustrated in FIG. 1. A supply 12 of unexpanded virgin (e.g. new, unrecycled) polystyrene beads 14 is first obtained. The unexpanded virgin polystyrene beads 14 are manufactured as described above. They are commercially available from a number of sources, including but not limited to the ARCO Chemical Company of Philadelphia, Pa.

Unexpanded virgin polystyrene beads are typically categorized by size when sold, as shown in Table 1:

TABLE 1

| Category | Avg. Diameter Range (in.) |
| --- | --- |
| Large | 0.033–0.079 |
| Intermediate | 0.023–0.047 |
| Small | 0.014–0.028 |
| Fine | 0.010–0.020 |
| Very Fine | 0.0083–0.0138 |

As previously discussed, a blowing agent (e.g. pentane gas) is entrained within the internal structure of the unexpanded virgin polystyrene beads 14 during the production thereof, the benefits of which will be described in greater detail below.

Thereafter, the unexpanded virgin polystyrene beads 14 are placed in a pre-expander unit 18 and heated. The pre-expander unit 18 consists of a sealed chamber 19 known in the art in which heating of the unexpanded virgin polystyrene beads 14 is accomplished through the application of steam 21 thereto from a source 22. In a preferred embodiment, the steam 21 is introduced into the pre-expander unit 18 from source 22 via line 24 where it is directly mixed with the unexpanded virgin polystyrene beads 14. Mixing is enhanced through the use of agitation means preferably in the form of blade-type agitator units 25 known in the art. However, other agitation means known in the art may be used, and the present invention shall not be limited exclusively to the use of blade-type agitator units 25.

The steam 21 and pentane gas contained with the unexpanded virgin polystyrene beads 14 promotes the expansion thereof. Residence time of the unexpanded virgin polystyrene beads 14 within the steam 21 in the pre-expander unit 18 will vary experimentally, depending on the amount of bead expansion which is desired. The resulting product consists of expanded virgin polystyrene beads 26 illustrated in FIG. 1 which typically have the following size characteristics as shown in Table 2 below:

TABLE 2

| Category | Avg. Diameter Range (in.) |
| --- | --- |
| Large | 0.098–0.270 |
| Intermediate | 0.068–0.160 |
| Small | 0.041–0.095 |

The expanded virgin polystyrene beads 26 have an average density of about 1.0–1.5 lb./cu. ft. To accomplish this, the amount of steam and other reaction conditions must be experimentally varied, depending on the ultimate bead size which is desired, and the final use for the beads. The techniques used to accomplish this are known in the art, and pilot studies are usually undertaken prior to full-scale production so that the exact expansion parameters may be determined. The production conditions which are used may therefore be varied by skilled individuals in accordance with known processes, as indicated above. For example, the longer the unexpanded virgin polystyrene beads 14 reside in the pre-expander unit 18, the larger and less dense they get. Accordingly, the residence time of the unexpanded virgin polystyrene beads 14 in the pre-expander unit 18 is predetermined based on the final product which will be made from the beads 14, along with other extrinsic factors.

During the foregoing expansion process, a substantial amount of pentane gas trapped within the unexpanded virgin polystyrene beads 14 is released. The released pentane gas 28 may be conventionally disposed of (e.g. by venting to the atmosphere). However, it is an inventive aspect of the present process that the released pentane gas 28 may optionally be pumped into a storage vessel 30 via a line 32 for subsequent use in later stages of the production process. In view of environmental concerns, it is preferable to reuse or recycle the released pentane gas 28 rather than venting it as described above. For example, the excess venting of pentane gas to the atmosphere may cause the formation of undesired ground smog.

In a preferred embodiment, the completed supply 33 of expanded virgin polystyrene beads 26 is then temporarily stored in a chamber 34 for a time period sufficient to allow the outgassing of a substantial portion of residual pentane gas 40 from the beads 26. This normally occurs over a 1–3 day period. The residual pentane gas 40 may then be conventionally disposed of as described above, or pumped via line 42 into the storage vessel 30 which is either empty or contains released pentane gas 28 obtained during expansion of the unexpanded virgin polystyrene beads 14 as previously described.

Simultaneous with or prior to the steps described above, a supply 50 of used expanded polystyrene foam 52 is obtained. The used polystyrene foam 52 may come from a variety of sources, including but not limited to packaging materials, used building materials, and other comparable expanded polystyrene foam articles.

The used polystyrene foam 52 is then passed into a grinding/shredding apparatus 54 of conventional design via conduit 55. The grinding/shredding apparatus 54 may involve numerous different systems known in the art, including but not limited to systems which incorporate a plurality of gears having teeth thereon which grind the used polystyrene foam 52. As a result, the used polystyrene foam 52 is converted into a plurality of small used expanded polystyrene foam chunks 58 which are preferably passed through a vibrating screen 60 so that the chunks 58 may be properly sized. This results in a supply of properly sized used expanded polystyrene foam pieces 61 shown in FIG. 1. In a preferred embodiment, the used polystyrene foam pieces 61 will have a size substantially equal to the average size of the expanded virgin polystyrene foam beads 26 as noted above. Thus, the screen 60 will have openings 62 therethrough which enable this to be accomplished. Having the expanded virgin polystyrene foam beads 26 and the used polystyrene foam pieces 61 be approximately equal in size facilitates the formation of a final molded product which consists of a homogenous mixture of virgin and non-virgin polystyrene materials as described in greater detail below.

The used polystyrene foam pieces 61 are maintained in a reaction chamber 64 where they are placed in contact with pentane gas. The pentane gas (generally designated at reference number 65 within the chamber 64) may come from a variety of sources. For example, the pentane gas 65 may be obtained via line 66 from the storage vessel 30 which contains pentane gas collected from other stages of the present process as described above (e.g. released pentane gas 28, residual pentane gas 40, or a combination of both). The pentane gas materials 28, 40 from the storage vessel 30 may be used alone or in combination with a supply 70 of virgin pentane gas 72 contained within a storage vessel 76 which is in fluid communication with the reaction chamber 64 via line 80. If the storage vessels 30, 76 are positioned above the reaction chamber 64 as schematically shown in FIG. 1, the pentane gas therefrom may effectively flow by gravity into the reaction chamber 64. This occurs because pentane gas (when cold) is heavier than air. Steps are then taken to ensure that the pentane gas 65 comes in direct and complete contact with the used polystyrene foam pieces 61. This may be accomplished through the use of agitator means in the form of blade-type units 82 which operate within the chamber 64 and physically mix the foam pieces 61 during the introduction of pentane gas 65. However, other types of agitator means known in the art may be used, and the present invention shall not be limited to only the use of blade-type systems.

After completion of this step, any remaining pentane gas 65 within the reaction chamber 64 may then be disposed of in a conventional manner or routed via line 86 back into the storage vessel 30 for subsequent reuse.

Treatment of the used polystyrene foam pieces 61 with pentane gas is an important processing step in the present invention. Through a physio-chemical mechanism which is not yet fully understood, pentane gas treatment of the used polystyrene foam pieces 61 enables such pieces 61 to physically fuse with virgin foam materials in the completed molded articles. As a result, the articles have an unexpectedly high degree of durability and structural integrity, with the used foam materials substantially contributing to these characteristics.

After pentane gas treatment, the used polystyrene foam pieces 61 and expanded virgin polystyrene beads 26 are together routed via lines 87, 88 respectively into a mixing chamber 89 having agitator means therein preferably in the form of blade-type units 90 which are schematically illustrated in FIG. 1. In a preferred embodiment, the resulting mixture 92 will contain no less than about 50% by weight used polystyrene foam pieces 61. This percentage value maximizes the effective utilization of waste polystyrene foam, and produces a final product having a substantial degree of strength and durability.

The mixture 92 is then routed via line 95 into a molding unit 96 of conventional design in which heat (e.g. steam) and pressure are applied in order to produce a final expanded polystyrene foam article 97 of a described shape and size. Molding of the mixture 92 in this manner is again accomplished in accordance with conventional foam processing techniques known in the art as generally discussed in the *Modern Plastics Encyclopedia*, Vol. 49, No. 10A (1972-1973) which is incorporated herein by reference as noted above. Steam 98 is supplied from a source 100 via a line 102 which is operatively connected to the molding unit 96 as illustrated. In a typical molding process, steam 98 is applied to the mixture 92 at a pressure of about 15 p.s.i (1 bar), with the steam temperature being maintained at about 212-250 degrees F. over a time period which may broadly range from about 30 seconds to about 2.5 minutes, depending on the size and configuration of the desired final article. However, these parameters may be suitably varied by those skilled in the art, depending on the type of molding machine involved, the structural features of the final product, and other external parameters.

The resulting article 97 is highly durable and makes substantial use of waste expanded polystyrene foam materials. A high degree of durability and structural integrity is obtained through treatment of the used polystyrene foam pieces 61 with pentane gas as described above. This step enables the used and virgin expanded polystyrene materials to properly fuse within the completed foam article, thereby enhancing its strength characteristics.

Having herein described preferred embodiments of the present invention, it is anticipated that suitable modifications may be made thereto by individuals skilled in the art which are within the scope of the invention. For example, the initial formation of the expanded virgin polystyrene beads as well as the molding processes described herein are conventional and may be varied in accordance with known foam manufacturing techniques. Thus, the present invention shall only be construed in accordance with the following claims:

That which is claimed is:

1. A method for manufacturing a polystyrene foam article from used polystyrene foam in combination with virgin polystyrene foam comprising the steps of:
    obtaining a supply of expanded virgin polystyrene beads;
    obtaining a supply of used polystyrene foam;
    grinding said used polystyrene foam in order to form a plurality of individual used polystyrene foam pieces;
    contacting said used polystyrene foam pieces with pentane gas;
    combining said expanded virgin polystyrene beads with said sued polystyrene foam pieces after said contacting of said used polystyrene foam pieces with said pentane gas in order to form a mixture; and
    exerting pressure on said mixture within a mold in order to form said polystyrene foam article.

2. The method of claim 1 wherein said obtaining of said supply of said expanded virgin polystyrene beads comprises the steps of:
    providing a supply of unexpanded virgin polystyrene beads; and
    heating said unexpanded virgin polystyrene beads in order to cause said unexpanded virgin polystyrene beads to expand.

3. The method of claim 2 wherein said heating of said unexpanded virgin polystyrene beads comprises contacting said unexpanded virgin polystyrene beads with steam.

4. The method of claim 1 wherein each of said used polystyrene foam pieces is approximately equal in size to each of said expanded virgin polystyrene beads.

5. The method of claim 1 wherein said mixture comprises at least about 50% by weight of said used polystyrene foam pieces.

6. The method of claim 1 further comprising the step of heating said mixture within said mold during said exerting of said pressure thereon.

7. The method of claim 6 wherein said heating of said mixture comprises contacting said mixture with steam.

8. A method for manufacturing a polystyrene foam article from used polystyrene foam in combination with virgin polystyrene foam comprising the steps of:
    providing a supply of unexpanded virgin polystyrene beads;
    heating said unexpanded virgin polystyrene beads in order to cause said unexpanded virgin polystyrene beads to expand and form a plurality of expanded virgin polystyrene beads, said heating comprising contacting said unexpanded virgin polystyrene beads with steam;
    obtaining a supply of used polystyrene foam;
    grinding said used polystyrene foam in order to form a plurality of individual used polystyrene foam pieces, each of said used polystyrene foam pieces being approximately equal in size to each of said expanded virgin polystyrene beads;
    contacting said used polystyrene foam pieces with pentane gas;
    combining said expanded virgin polystyrene beads with said used polystyrene foam pieces after said contacting of said used polystyrene foam pieces with said pentane gas in order to form a mixture containing at least about 50% by weight said used polystyrene foam pieces;
    exerting pressure on said mixture within a mold; and
    heating said mixture within said mold during said exerting of said pressure thereon, said heating comprising contacting said mixture with steam in order to form said polystyrene foam article.

9. A method for manufacturing a polystyrene foam article from used polystyrene foam in combination with virgin polystyrene foam comprising the steps of:
    obtaining a supply of used polystyrene foam;
    obtaining a supply of unexpanded virgin polystyrene beads having pentane gas contained therein;
    expanding said unexpanded virgin polystyrene beads in order to form a plurality of expanded virgin polystyrene beads, said expanding of said unexpanded virgin polystyrene beads generating a supply of released pentane gas therefrom;
    grinding said used polystyrene foam in order to form a plurality of individual used polystyrene foam pieces;
    contacting said used polystyrene foam pieces with said released pentane gas;
    combining said expanded virgin polystyrene beads with said used polystyrene foam pieces after said contacting of said used polystyrene foam pieces with said released pentane gas in order to form a mixture; and exerting pressure on said mixture within a mold in order to form said polystyrene foam article.

10. The method of claim 9 wherein said expanding of said unexpanded virgin polystyrene beads comprises heating said unexpanded virgin polystyrene beads in order to form said expanded virgin polystyrene beads.

11. The method of claim 10 wherein said heating of said unexpanded virgin polystyrene beads comprises contacting said unexpanded virgin polystyrene beads with steam.

12. The method of claim 9 wherein each of said used polystyrene foam pieces is approximately equal in size to each of said expanded virgin polystyrene beads.

13. The method of claim 9 wherein said mixture comprises at least about 50% by weight of said used polystyrene foam pieces.

14. The method of claim 9 further comprising the step of heating said mixture within said mold during said exerting of said pressure thereon.

15. The method of claim 14 wherein said heating of said mixture comprises contacting said mixture with steam.

16. The method of claim 9 further comprising the step of storing said expanded virgin polystyrene beads for a time period sufficient to allow outgassing of residual pentane gas therefrom.

17. The method of claim 16 further comprising the step of contacting said used polystyrene foam pieces with said residual pentane gas.

18. The method of claim 9 further comprising the steps of:

providing a supply of virgin pentane gas; and contacting said used polystyrene foam pieces with said virgin pentane gas.

19. A method for manufacturing a polystyrene foam article from used polystyrene foam in combination with virgin polystyrene foam comprising the steps of:

obtaining a supply of used polystyrene foam;

obtaining a supply of unexpanded virgin polystyrene beads having pentane gas contained therein;

heating said unexpanded virgin polystyrene beads in order to cause said unexpanded virgin polystyrene beads to expand and form a plurality of expanded virgin polystyrene beads, said heating comprising contacting said unexpanded virgin polystyrene beads with steam, said heating of said unexpanded virgin polystyrene beads generating a supply of released pentane gas therefrom;

storing said expanded virgin polystyrene beads for a time period sufficient to allow outgassing of residual pentane gas therefrom;

grinding said used polystyrene foam in order to form a plurality of individual used polystyrene foam pieces, each of said used polystyrene foam pieces being approximately equal in size to each of said expanded virgin polystyrene beads;

contacting said used polystyrene foam pieces with said released pentane gas and said residual pentane gas;

combining said expanded virgin polystyrene beads with said used polystyrene foam pieces after said contacting of said used polystyrene foam pieces with said released pentane gas and said residual pentane gas in order to form a mixture, said mixture comprising at least about 50% by weight of said used polystyrene foam pieces;

exerting pressure on said mixture within a mold; and heating said mixture within said mold during said exerting of said pressure thereon, said heating comprising contacting said mixture with steam in order to form said polystyrene foam article.

20. The method of claim 19 further comprising the steps of:

providing a supply of virgin pentane gas; and contacting said used polystyrene foam pieces with said virgin pentane gas.

* * * * *